(No Model.) 2 Sheets—Sheet 1.
S. HUGHES.
APPARATUS FOR TREATING PHOSPHATE ROCK.
No. 514,006. Patented Feb. 6, 1894.
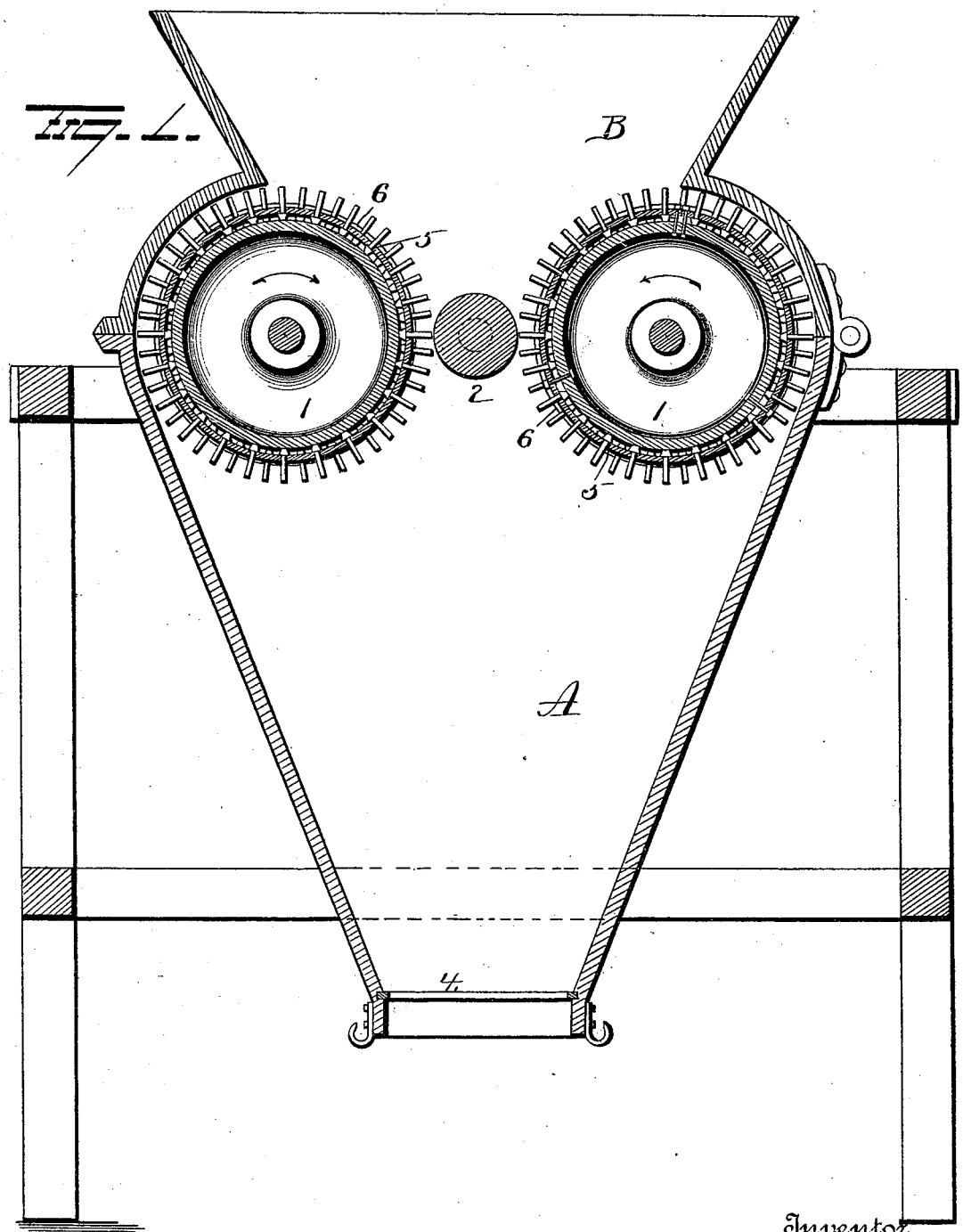

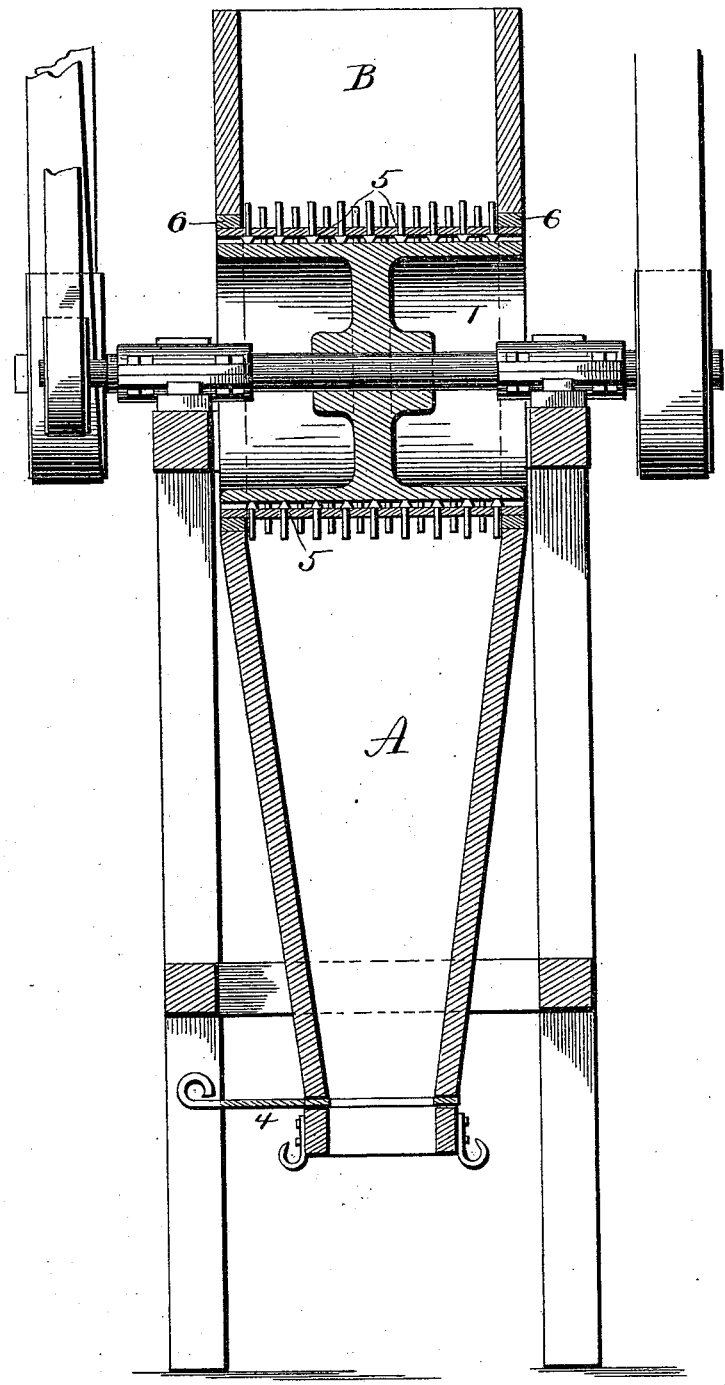

United States Patent Office.

SAMUEL HUGHES, OF CHARLESTON, SOUTH CAROLINA.

APPARATUS FOR TREATING PHOSPHATE ROCK.

SPECIFICATION forming part of Letters Patent No. 514,006, dated February 6, 1894.

Application filed March 25, 1893. Serial No. 468,622. (No model.)

*To all whom it may concern:*

Be it known that I, SAMUEL HUGHES, of Charleston, in the county of Charleston and State of South Carolina, have invented certain new and useful Improvements in Apparatus for Treating Phosphate Rock; and I do hereby declare the following to be a full, clear, and exact description of the invention, such as will enable others skilled in the art to which it appertains to make and use the same.

My invention relates to an improvement in apparatus for treating phosphate rock in its green or crude state. The green or crude material after having been ground and mixed with the sulphuric acid has this characteristic namely, that it dries more or less rapidly on its exposed surface but remains moist for a long period in the interior and in consequence much time and expense are required in the treatment of the mixture to bring it to a commercial consistency. After mixing the rock and acid the mixture naturally assumes a more or less lumpy shape, and these lumps soon becoming dry on the exterior still remain moist in the interior. Without waiting for these lumps to thoroughly dry which would require much time and be rather expensive, it has usually been taken heretofore after standing a certain length of time, and passed through crushing rolls or through screens. Both these operations have been unsatisfactory and largely unsuccessful for the reason that the throat of the hopper leading to the rolls or the meshes of the screens would very soon choke with the soft pasty interior of the lumps and in a short while, generally in a few hours, require cleaning out at the loss of much time, hence resulting in an additional cost of production.

It is the object of my invention to reduce the time required in treating the material, and lessen the cost of manipulation, and a still further object is to produce a product of superior commercial value.

A further object is to produce novel and more simple machinery than heretofore for effecting the results sought to be accomplished.

With these ends in view my invention consists in certain novel features of construction and combinations of parts which will be hereinafter described and pointed out in the claims.

In the accompanying drawings Figure 1 is a view in vertical longitudinal section through my improved machine, and Fig. 2 is a view in transverse section.

In order to a more thorough understanding of the machine as now constructed and to better demonstrate the utility of the several features, it may be well to briefly outline in a very general way the different constructions made in the evolution of the present invention. And first in the throat of the hopper I place a rigid bar and a rotary toothed cylinder. In this construction the soft material is thrown against the side of the hopper throat where it sticks and eventually bridges over and chokes the machine. To avoid this tendency to choke or stick on the throat I provided a movable bar; but this soon became clogged. To relieve this, I placed a roller in the side of the hopper at the point where the soft material usually stuck; but this only shifted the position of the soft material from one part to another. Finally a third toothed roller was arranged in position to remove the soft material from the intermediate roller. This resulted in the present construction which simply consists in the three rollers transposed to the position shown.

In the construction shown A represents the body of the machine and B is a hopper hinged or otherwise removably secured thereto. In the throat two toothed rollers 1, 1, are journaled and between the toothed rollers an intermediate roller 2 is journaled, the relative positions of the three rollers being such that the teeth of the outer rollers just clear the surface of the intermediate roller. The outside or toothed rollers are made to revolve at a high speed and the intermediate roller might be an idle roller or be made to turn at any speed desired preferably rather slow. The green or crude material is hoisted by an elevator (not shown) or by other convenient means and dumped into the hopper whence it descends by its own gravity to the rollers which operate upon it. The object of the intermediate roller is now obvious. Without it the lumps of material would drop between the teeth of the outer rollers which revolve rapidly toward each other in a downward direction and would in consequence be forced through between the rollers without being disintegrated. The intermediate roller forms an obstruction which absolutely prevents the lumps from passing through until they have been thoroughly disintegrated. By means of the intermediate roller the rolls or lumps of material are held at a tangent at all times to the teeth of the outer rollers, so that the said teeth have a switching action constantly removing the outside particle by particle until finally the lump disappears and the material removed drops down into the bottom of the machine in small particles.

At the lower end the machine is provided with a spout to which a bag may be attached to receive the finished material. The material is removed simply by pulling the slide 4 out until the bag or other receptacle is filled after which the slide is pushed in again to cut off the feed.

The toothed rollers might be variously constructed; but I prefer to construct them in the following manner: A sheet of metal about a quarter of an inch in thickness has a series of holes 5, 5, bored or punched through it. These are preferably arranged about a half of an inch apart in each transverse row and the rows are separated about an inch and a quarter the holes of adjacent rows alternating or staggering. In these holes pins are driven and the sheet is then bent around the roller proper and the edges bolted thereto, to hold the edges in shape when bolted onto the roller. The space between the sheet metal casing and roller partly occupied by the bolt heads may be filled in with Babbitt metal, filling blocks at intervals or by other means as desired. Around the ends of the rollers, bands 6, 6, are shrunk or otherwise secured. In this manner the sheet metal shell is held secure at the outer edges and to this portion the rounded out portions of the hopper are fitted to prevent the escape of the material. I may add in this connection that the hopper is hinged in place so that the operator may use a wire brush from time to time to clean the teeth of the rollers should any material collect thereon as is likely to be the case more or less.

It is evident that slight changes might be resorted to in the form and arrangement of the several parts described without departing from the spirit and scope of my invention and hence I do not wish to limit myself to the exact construction herein set forth; but, Having fully described my invention, what I claim as new, and desire to secure by Letters Patent, is—

1. The combination with a body portion and hopper, of a pair of toothed rollers, and an intermediate toothless roller adapted to form an obstruction to the bodily passage of the material being operated between the toothed rollers, substantially as set forth.

2. The combination with a body portion terminating at the lower end in a spout, and a valve for opening and closing the spout, a pair of toothed rollers, and an intermediate idle roller, substantially as set forth.

3. The combination with a body portion, and a removable hopper located thereon, of a pair of toothed rollers, and an intermediate toothless roller, substantially as set forth.

4. A roller consisting of a body portion, and a shell of sheet metal having holes therein, pins secured in the holes, said shell bent around the body portion, and bands surrounding the ends of the shell and holding it in place around the body portion, substantially as set forth.

In testimony whereof I have signed this specification in the presence of two subscribing witnesses.

SAML. HUGHES.

Witnesses:
S. G. NOTTINGHAM,
V. E. HODGES.